Jan. 14, 1936.    O. N. PLANTE    2,028,009
ELECTRIC OUTLET
Filed Nov. 1, 1933    3 Sheets-Sheet 1
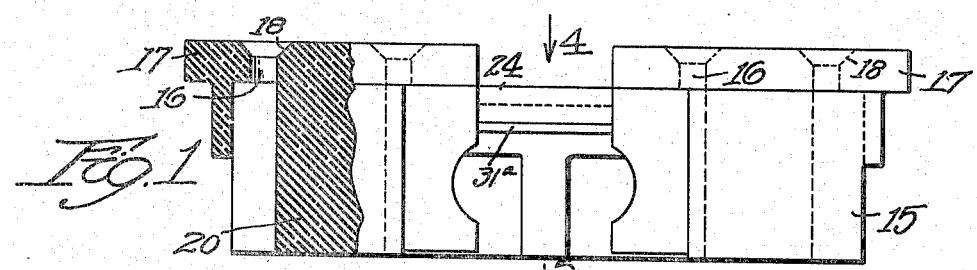
Fig.1
Fig.2
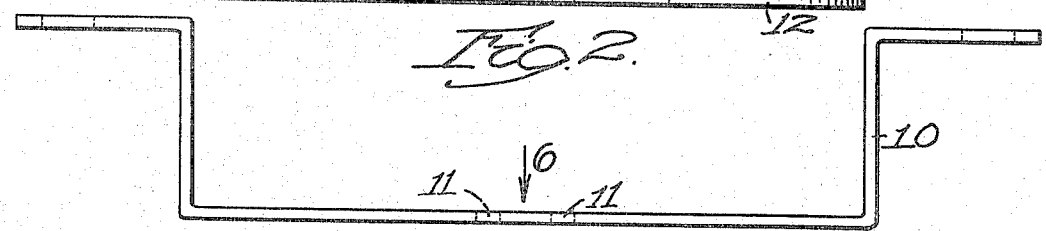
Fig.3
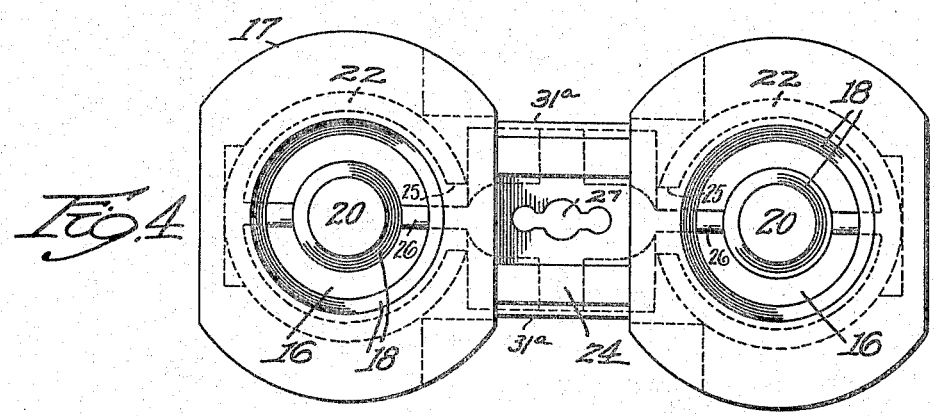
Fig.4
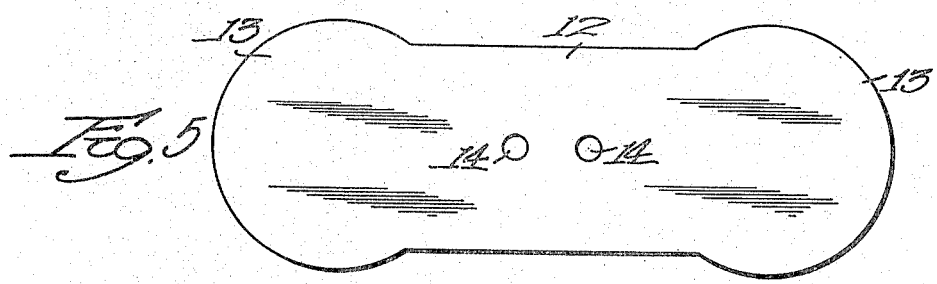
Fig.5
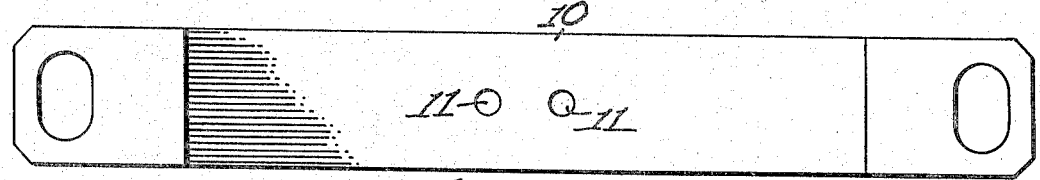
Fig.6
Inventor:
Oliver N. Plante Jan. 14, 1936.                O. N. PLANTE                 2,028,009
                             ELECTRIC OUTLET
                          Filed Nov. 1, 1933           3 Sheets-Sheet 2
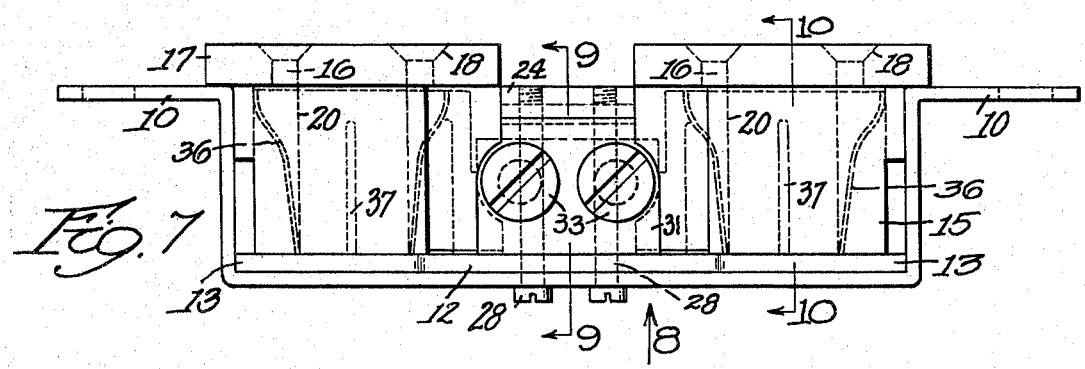
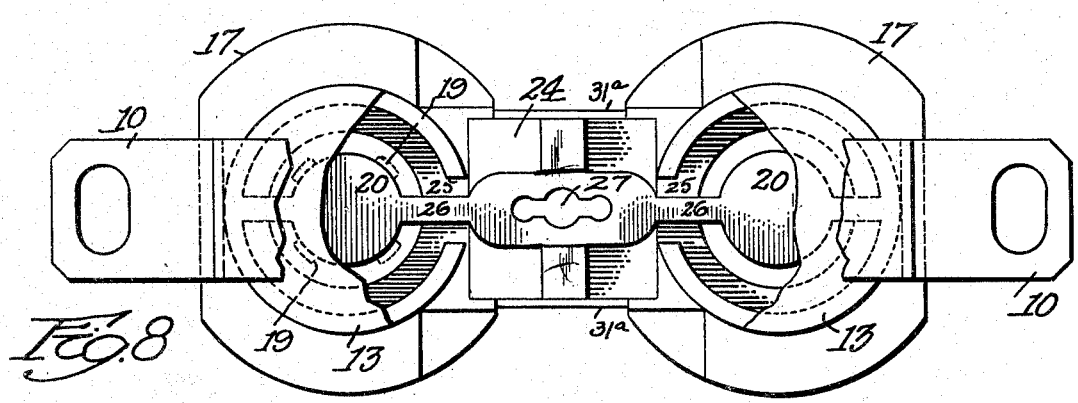
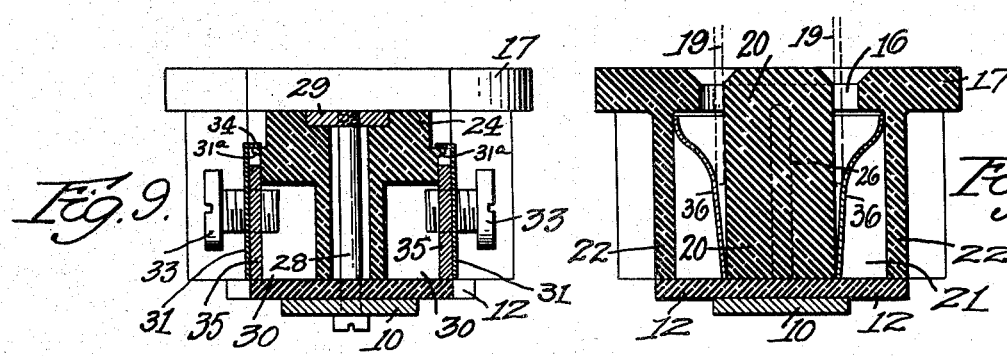
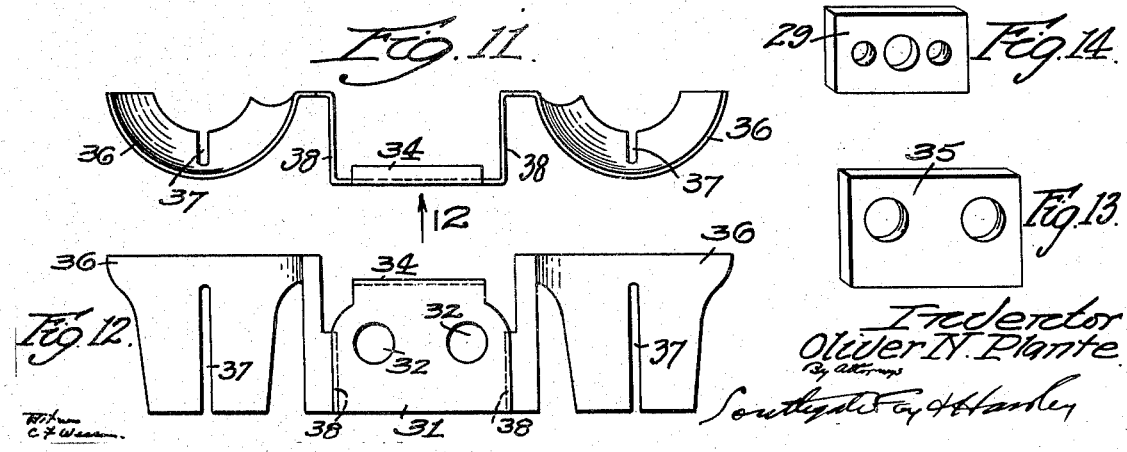
Inventor
Oliver N. Plante Jan. 14, 1936.   O. N. PLANTE   2,028,009
ELECTRIC OUTLET
Filed Nov. 1, 1933   3 Sheets-Sheet 3

Inventor
Oliver N. Plante
By attorneys

Patented Jan. 14, 1936

2,028,009

UNITED STATES PATENT OFFICE 2,028,009

ELECTRIC OUTLET

Oliver N. Plante, Worcester, Mass.

Application November 1, 1933, Serial No. 696,235

1 Claim. (Cl. 173—330)

This invention relates to an outlet ordinarily employed for domestic use serving as a socket for receiving an electric plug having two prongs.

The principal objects of the invention are to provide a socket or outlet in which the plug can be introduced at any point around the circle or semicircle and thus enable the user to insert the plug easily in the dark; to provide a construction which will be fully insulated and made of a minimum number of parts, and more specifically to provide a curved or semicircular socket.

Other objects and advantages of the invention will appear hereinafter.

Reference is to be had to the accompanying drawings, in which

Fig. 1 is a plan, partly in section, of an insulating member of an electric outlet constructed in accordance with this invention and having two sockets;

Fig. 2 is a similar view of an insulating cap designed to be retained at the end of the member shown in Fig. 1;

Fig. 3 is a similar view of a metal bracket for supporting the above mentioned members;

Figure 15:
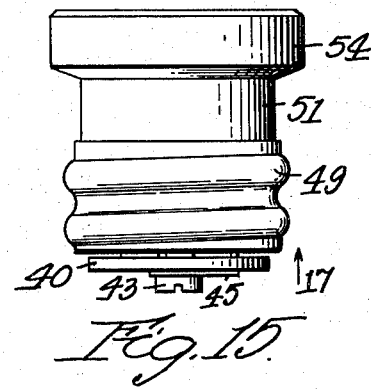
Figure 16:
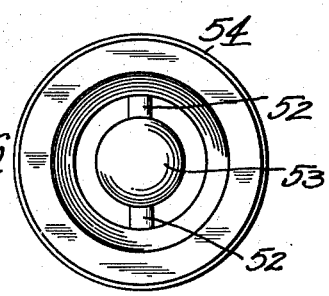
Figure 18:
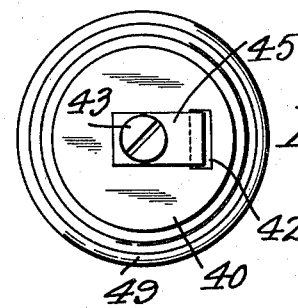
Figure 19:
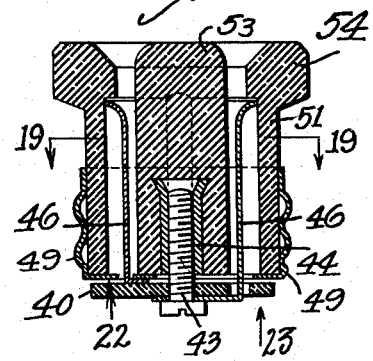
Figure 20:
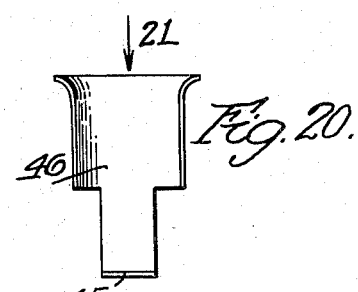
Figure 21:
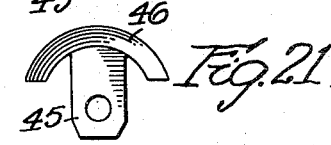
Figure 22:
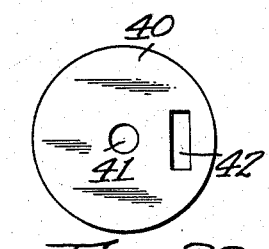

Figs. 4, 5 and 6 are elevations, as indicated respectively by the arrows 4, 5 and 6 in Figs. 1, 2 and 3;

Fig. 7 is a plan of the completed outlet;

Fig. 8 is an end view of the same, as indicated by the arrow 8 in Fig. 7 with the holding bracket broken away;

Figs. 9 and 10 are transverse sectional views on the lines 9—9 and 10—10 respectively of Fig. 7;

Fig. 11 is an elevation of the metallic connector part of the outlet;

Fig. 12 is a plan of the same as indicated by the arrow 12 in Fig. 11;

Fig. 13 is a perspective view of a terminal nut constituting a part of the device;

Fig. 14 is a perspective view of an assembly nut;

Fig. 15 is a plan of an embodiment of the invention, shown as a single circular socket;

Fig. 16 is a front view of the same;

Fig. 17 is an end view;

Fig. 18 is a diametrical longitudinal sectional view;

Fig. 19 is a transverse sectional view on the line 19—19 of Fig. 18;

Fig. 20 is a plan of the metallic electrical conducting member of the socket;

Fig. 21 is an end view of the same, as indicated by the arrow 21 in Fig. 20;

Fig. 22 is an elevation of an insulating member at the end of the socket, and

Figure 23:
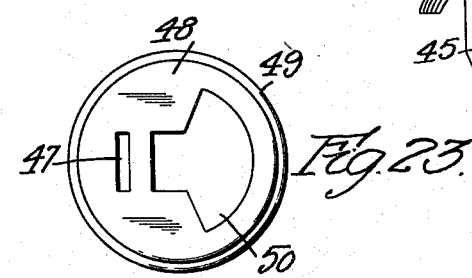

Fig. 23 is a similar view of the metallic member at the end of the socket.

This outlet, as stated, is designed chiefly for the purpose of enabling the user to find the socket with the usual plug when the socket is located in a dark or inaccessible place. The invention also involves the improvement of the outlet in other respects so that it can be made of "bakelite", as an insulating material and molded practically in one piece without losing the advantage of the curved or semicircular socket.

It is well known that it is difficult to place a pronged plug in the sockets of ordinary construction although the openings for receiving the prongs have been chamfered or beveled. With the present construction the only thing to be done is to place the prongs in the right position centrally but they do not have to be located in any position angularly. Wherever they hit they will be received in the socket and it makes no difference whether they are at right angles to a certain line or not.

Three principal elements of a double socket or outlet are shown in the first six figures. A metallic bracket 10 is attached to the wall and provided with openings 11 for receiving screws for holding the parts in position. The second part is a flat insulating cap or cover 12 having two rounded ends 13 and two openings 14 for receiving the same screws above mentioned. This cap is made of an insulating material, preferably "bakelite".

The third element shown in this figure is a "bakelite" insulating block 15 which is in a single piece and is backed up by the cap 12 and is held, of course, against the wall either in horizontal or some other position by the bracket 10. This insulating piece is shown in this figure as having provisions for two sockets, as will appear. It is provided with a flat base which engages the cap 12, this base being located vertically when the outlet is placed against a vertical wall. This single piece of "bakelite" is provided with two circular sockets 16, one at each end. It is not essential that they be circular but at least they are located on curved arcs.

These sockets are located at each end of the insulating member in a vertical wall 17 thereof and extend all the way through this wall. They are chamfered or slanted away on their outer surfaces at 18 for receiving the prongs 19 of the plugs which are to be placed therein. The entire center of each socket is taken up with a cylindrical member 20 integral with the rest of the insulating member.

Back of the wall 17 and surrounding the cylindrical member 20 is a preferably cylindrical recess 21 bounded by outer cylindrical walls 22. The purpose of this recess will be taken up later. At the end it is open but it is covered by the cap 12.

As stated, two of these sockets are provided in the form of outlets shown in the first fourteen figures. Between the two walls 17 and corresponding sockets is located a substantially rectangular part 24 of "bakelite" integral with the rest of the insulating member and constituting a connection between the two ends and also a connection at the two sides. This is not as thick as the socket piece leaving a depression in the center at the front.

The members 22 are not completely circular but are spaced from each other at the inner side to provide passages 25 and also they provide spaces through which radial ribs 26 on that side pass to connect integrally with the central member 24, the corresponding ribs on the outer side being integrally connected with the cylindrical wall 20.

This, it will be seen, leaves the space 25 divided into two parts into which throughout its length another member can be passed as it is all open and free. In the center of the block 24 is an opening 27 which extends throughout its length and receives screws 28 which are the screws passing through the openings 11 and 14 in the bracket and cap respectively. These screws pass into an assembly nut 29 having screw holes for receiving them and fasten the parts together because the holes of the screw engage the bracket and the nut rests on shoulders molded or depressed in the wall of the member 24.

The central hole in this assembly nut is in registration with the central enlargement of the hole 27. In the block 24 there are a pair of spaces 30 and just beyond are shoulders 31ª.

Of course, in an outlet there has to be a metallic member for making contacts. In this case the metallic member is in the form of a pair of pieces of metal 31. Each, at its center, has two openings 32 for receiving binding screws 33 for connecting electric wires, to the member 31. Behind the flat surface of the central part, containing the openings 32, is a terminal nut 35 of metal. This nut has two screw threaded openings for receiving the screw 33 so that this bolt can be tightened up to tighten the plate 31 to the nut 35. This plate 31 at the top has a horizontal shoulder 34 which rests over the shoulders 31ª on the plug 24. The spaces 30 therefore are provided to receive the projecting ends of the screws 33 when they have secured the wire terminals to the metallic conducting plates 31.

These plates 31 are provided with integral arcuate or substantially semicircular contacting members 36. These preferably are slit at 37 to make them flexible and they are made concave and of a general conical shape. They are so connected with the plates 31 that they can be placed in position with each plate 31 on one of the two outer and exposed surfaces of the block 24 and two arms 38 on each conducting plate will project inwardly along the side of said block 24. Projections on the edges of these arms 38 will project through the spaces 25 so that the semiconical pieces 36 will rest in the spaces 21 and be centered on the central cylindrical members 23 of the insulating block. These parts, as will be obvious, are located in the position indicated best in Fig. 10 in which the two half conical concave terminal contactors 36 are on opposite sides of the cylindrical elements 20 of the insulating member. The prongs 19 of the conducting plugs can be moved in as indicated in dotted lines in Fig. 10 and it is certain that a connection will be made across.

It will be noticed that these prongs can be introduced at various points around the plug or at any rate along a space where they strike the ribs 26. These ribs are slanted off at both sides at the end so that if the prongs do touch the ribs they will have to slip off them and a connection made. If the operator has to move them slightly because they do touch the ribs, it is very simple and easy to do and in most cases no turning action has to be performed and no adjustment has to be made other than that caused by the striking of the prongs on the slanting surfaces 18 in order to connect up the outlet properly for conduction of current.

The form in which this invention is shown on the last sheet of drawings is a screw socket for receiving the same plug as indicated in the other sheets. This socket has at the end an insulating cap or plate 40 provided with a central hole 41 and an eccentric slot 42. The hole 41 receives a binding screw 43 which not only unites it to a metallic sleeve 44 but also unites the screw to the end 45 of a sheet metal conducting member 46. This member is shown as nearly semi-cylindrical in shape and as flared out at the top at a slope for the same purpose as the shapes in the other sheets of drawings and it passes through the slot 42.

A corresponding conducting member 46 is located opposite the first named one and it passes through a slot 47 in the base 48 of a sheet metal screw threaded piece 49 which constitutes the screw plug and enables the whole article to be screwed into a screw socket. The left hand connecter 46 is bent inwardly at the bottom and held under a solid part of the base 48 when the parts are secured together and as both parts 46 and 48 are of metal it constitutes a complete conductor to the screw thread. The right hand connecter 46 passes through a large opening 50 in the base 48 and thus is free from any chance of electrical connection and short circuiting at this point even though the plate 40 may be displaced slightly in assembling.

The insulating part of the outlet socket is formed of "bakelite" or other suitable insulating material and involves a cylindrical part 51 open at the end but having a pair of radial inwardly extending ribs 52 which connect it integrally with a cylinder 53 at the center in which the sleeve 44 is located.

A wall 54 similar to the wall 17 ordinarily is connected in a vertical plane though not necessarily so. This wall is provided with a central opening through which extends the cylinder 53. The top of the cylinder is beveled, chamfered or flared off to allow the prongs to be inserted easily where they come in between the connecter 46 and the surface of the cylinder 53. This device constitutes a screw plug which will screw into a usual screw socket and become itself a socket for the reception of the prongs of the connecting plug.

In this form, as in the other, the plug can be inserted at any point around the circumference and can easily find a place in which they will properly connect up the circuits. It is a very convenient arrangement for use in a place that is hard to reach or one in which there is not enough light.

Although I have illustrated and described two forms of the invention I am aware of the fact that other modifications can be made therein by any person skilled in the art without departing from the scope of the invention as expressed in the claim. Therefore, I do not wish to be limited in this respect otherwise than as set forth in the claim, but what I do claim is:—

In an electric outlet, the combination of a bracket, a block of insulating material therein comprising a hollow cylindrical outer member and a central solid inner cylindrical member spaced therefrom, an insulating cap at one end of the block covering one end of each cylindrical member to separate any metallic parts therein from the bracket, said block being provided with two concentric registering substantially semicircular grooves extending in from its outer face between said two members for receiving the flat tangential prongs of an electric plug at any point around said grooves, means integrally connecting the inner and outer cylindrical members and separating the grooves and having spaces at the end of said grooves, a substantially semicircular conically concave spring metallic contactor member on each side of the inner cylindrical member in said spaces, extending from end to end of the block and engaging the central cylindrical member at one end thereof only, and means for fastening the cap and insulating block together, comprising an assembly nut, and a screw for entering the nut, said block being provided with shoulders for receiving said nut and holding it against the action of the screw.

OLIVER N. PLANTE.